(12) United States Patent
Shekhawat et al.

(10) Patent No.: US 9,159,464 B2
(45) Date of Patent: *Oct. 13, 2015

(54) THERMALLY AND ELECTRICALLY CONDUCTIVE STRUCTURE COMPRISING A CARBON NANOTUBE, A GRAPHITE SHEET AND A METAL LAYER; AND METHOD OF REDUCING A CONTACT RESISTANCE OF SAME

(71) Applicant: Intel Corporation, Santa Clara, CA (US)

(72) Inventors: Linda Shekhawat, Casa Grande, AZ (US); Nachiket Raravikar, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/852,343

(22) Filed: Mar. 28, 2013

(65) Prior Publication Data

US 2013/0216828 A1  Aug. 22, 2013

Related U.S. Application Data

(60) Continuation of application No. 13/371,575, filed on Feb. 13, 2012, now Pat. No. 8,409,665, which is a division of application No. 12/587,371, filed on Oct. 5, 2009, now Pat. No. 8,133,585, which is a division of application No. 11/845,145, filed on Aug. 27, 2007, now Pat. No. 7,618,679.

(51) Int. Cl.
*B32B 5/16* (2006.01)
*B05D 3/02* (2006.01)
(Continued)

(52) U.S. Cl.
CPC . *H01B 1/04* (2013.01); *B82Y 30/00* (2013.01); *B82Y 40/00* (2013.01); *C01B 31/0253* (2013.01); *H01B 13/32* (2013.01); *C01B 2202/22* (2013.01); *C01B 2202/24* (2013.01);
(Continued)

(58) Field of Classification Search
USPC .......... 428/403–407, 698, 699, 700; 427/215, 427/220, 221, 228; 977/746, 745
See application file for complete search history.

(56) References Cited

U.S. PATENT DOCUMENTS 6,352,775 B1 *  3/2002  Sasaki et al. ................... 428/403
6,582,673 B1 *  6/2003  Chow et al. ................ 423/445 R
(Continued)

OTHER PUBLICATIONS

He et al., Coating of ultrathin polymer films on carbon nanotubes by a plasma treatment, Mat. Res. Soc. Symp. Proc. vol. 740, 93-99 (2003).*
(Continued)

*Primary Examiner* — Holly Le
(74) *Attorney, Agent, or Firm* — Winkle, PLLC

(57) ABSTRACT

A thermally and electrically conductive structure comprises a carbon nanotube (110) having an outer surface (111) and a carbon coating (120) covering at least a portion of the outer surface of the carbon nanotube. The carbon coating may be applied to the carbon nanotube by providing a nitrile-containing polymer, coating the carbon nanotube with the nitrile-containing polymer, and pyrolyzing the nitrile-containing polymer in order to form the carbon coating on the carbon nanotube. The carbon nanotube may further be coated with a low contact resistance layer (130) exterior to the carbon coating and a metal layer (140) exterior to the low contact resistance layer.

14 Claims, 5 Drawing Sheets

(51) Int. Cl.
  *B05D 7/00* (2006.01)
  *H01B 1/04* (2006.01)
  *B82Y 30/00* (2011.01)
  *B82Y 40/00* (2011.01)
  *C01B 31/02* (2006.01)
  *H01B 13/32* (2006.01)

(52) U.S. Cl.
  CPC .............. *Y10S977/742* (2013.01); *Y10S 977/75* (2013.01); *Y10T 428/13* (2015.01); *Y10T 428/292* (2015.01); *Y10T 428/2918* (2015.01); *Y10T 428/2991* (2015.01); *Y10T 428/2998* (2015.01)

(56) References Cited

U.S. PATENT DOCUMENTS

| | | |
|---|---|---|
| 6,652,968 B1 * | 11/2003 | Miller et al. .................. 428/407 |
| 6,852,410 B2 * | 2/2005 | Veedu et al. .................. 428/367 |
| 6,890,654 B2 | 5/2005 | Stupp et al. |
| 7,264,876 B2 | 9/2007 | Smalley et al. |
| 7,351,443 B2 | 4/2008 | Taomoto et al. |
| 7,361,430 B1 | 4/2008 | Gennett et al. |
| 7,534,648 B2 | 5/2009 | Raravikar et al. |
| 7,553,681 B2 | 6/2009 | Raravikar et al. |
| 7,754,328 B2 | 7/2010 | Chokai et al. |
| 7,859,104 B2 | 12/2010 | Yao et al. |
| 7,897,131 B2 | 3/2011 | Kang et al. |
| 8,133,585 B2 * | 3/2012 | Shekhawat et al. ........... 428/403 |
| 8,409,665 B2 * | 4/2013 | Shekhawat et al. ........... 427/215 |
| 2004/0142172 A1 * | 7/2004 | Sugiyama et al. ............ 428/403 |
| 2006/0051579 A1 | 3/2006 | Chokai et al. |
| 2006/0057050 A1 | 3/2006 | Ren et al. |
| 2009/0061125 A1 * | 3/2009 | Shekhawat et al. .......... 428/34.1 |
| 2011/0068291 A1 | 3/2011 | Park et al. |

OTHER PUBLICATIONS

Liebau, et al., "Contact Improvement of Carbon Nanotubes via Electroless Nickel Deposition", Applied Physics A 77, 731-734, Nov. 2003, 2 pages.

Liu, et al., "Benchmarking of Metal-to-Carbon Nanotube Side Contact Resistance", IEEE, Interconnect Technology Conference, 2008. IITC, 2008, pp. 143-146.

Zalich, M. A., et al., "Structural and Magnetic Properties of Oxidatively Stable Cobalt Nanoparticles Encapsulated in Graphite Shells", Chem. Mater., vol. 18, No. 11, 2006, 20 pages.

Min, et al., "Oxidative Stabilization of PAN/SWNT Composite Fiber", Carbon 42, Dec. 8, 2004, 2 pages.

Sreekumar, et al., "Polyacrylonitrile Single-Walled Carbon Nanotube Composite Fibers", Adv. Mater, 16, No. 1, Jan. 5, 2004, 4 pages.

Tersoff, J., "Contact Resistance of Carbon Nanotubes", Appl. Phys., vol. 74, No. 15, Apr. 1999, 2 pages.

Woo, et al., "Reduced Contact Resistance Between an Individual Single-Walled Carbon Nanotube and a Metal Electrode by a Local Point Annealing", Nanotechnology 18, 2007, 2 pages.

\* cited by examiner ional of U.S. patent application Ser. No. 12/587,371 [now U.S. Pat. No. 8,133,585], filed on Oct. 5, 2009, which was a divisional of U.S. patent application Ser. No. 11/845,145 [now U.S. Pat. No. 7,618,679], filed on Aug. 27, 2007.

THERMALLY AND ELECTRICALLY CONDUCTIVE STRUCTURE COMPRISING A CARBON NANOTUBE, A GRAPHITE SHEET AND A METAL LAYER; AND METHOD OF REDUCING A CONTACT RESISTANCE OF SAME

CLAIM OF PRIORITY

This application is a continuation of U.S. patent application Ser. No. 13/371,575 [now U.S. Pat. No. 8,409,665], filed on Feb. 13, 2012, which was a divisional of U.S. patent application Ser. No. 12/587,371 [now U.S. Pat. No. 8,133,585], filed on Oct. 5, 2009, which was a divisional of U.S. patent application Ser. No. 11/845,145 [now U.S. Pat. No. 7,618,679], filed on Aug. 27, 2007.

FIELD OF THE INVENTION

The disclosed embodiments of the invention relate generally to microelectronic devices and packages, and relate more particularly to carbon nanotubes used in such microelectronic devices and packages.

BACKGROUND OF THE INVENTION

Carbon nanotubes have high current carrying capacity as well as high thermal conductivity. However, their use in semiconductor packages is limited due to electron and phonon scattering occurring at their interfaces, leading to high electrical and thermal resistances. A major challenge in overcoming such limitations lies in tailoring the interface to control interface resistance. Typically it is proposed that the nanotube surface should be functionalized with low interface resistance materials, or that a low contact resistance material such as titanium or nickel should be sputtered onto the ends of a carbon nanotube. Functionalization, however, introduces defects in the nanotube structure and may deteriorate its intrinsic thermal and electrical properties, while sputtering with low contact resistance materials may not always achieve good bonding with nanotubes, especially if the sputtered metal is not a carbide former. Alternate methods of tailoring the nanotube interface are therefore necessary, methods that form good interfacial adhesion and lower contact resistance at nanotube surfaces without compromising the nanotubes' desirable intrinsic properties.

BRIEF DESCRIPTION OF THE DRAWINGS

The disclosed embodiments will be better understood from a reading of the following detailed description, taken in conjunction with the accompanying figures in the drawings in which.

Figure 1:
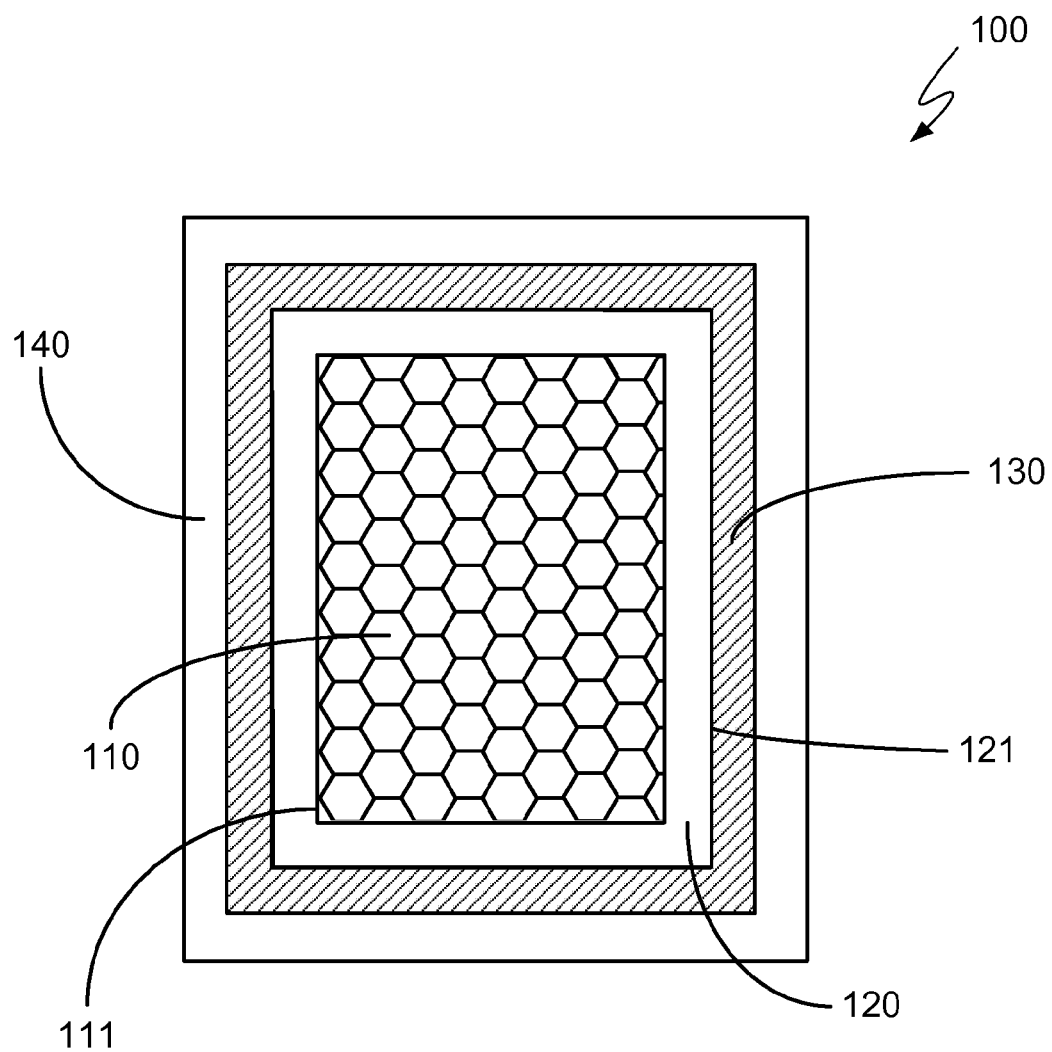
FIG. 1 is a cross-sectional view of a thermally and electrically conductive structure according to an embodiment of the invention.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

DETAILED DESCRIPTION OF THE DRAWINGS

In one embodiment of the invention, a thermally and electrically conductive structure comprises a carbon nanotube having an outer surface and a carbon coating covering at least a portion of the outer surface of the carbon nanotube. The carbon coating may be applied to the carbon nanotube, in one embodiment, by providing a nitrile-containing polymer, coating the carbon nanotube with the nitrile-containing polymer, and pyrolyzing the nitrile-containing polymer in order to form the carbon coating on the carbon nanotube.

The application of the carbon coating may assist in the reduction of contact resistance for the carbon nanotube and may further provide a reactive surface that can be utilized to further extend the carbon nanotube to applications in either hydrophobic or hydrophilic environments. As an example, the carbon coating may act as a site for the attachment or coating of materials that reduce thermal or electrical contact resistance between the nanotube and other materials. To that end, a low contact resistance layer may be formed exterior to the carbon coating and a metal layer may be formed exterior to the low contact resistance layer. These processes do not alter the nanotube's structure and therefore do not disturb the intrinsic electrical and thermal properties of the nanotube.

Referring now to the drawings, FIG. 1 is a cross-sectional view of a thermally and electrically conductive structure 100 according to an embodiment of the invention. As illustrated in FIG. 1, thermally and electrically conductive structure 100 comprises a carbon nanotube 110 having an outer surface 111 and further comprises a carbon coating 120 covering at least a portion of outer surface 111 of carbon nanotube 110. Carbon nanotube 110 can be a single walled carbon nanotube (SWCNT), a double walled carbon nanotube (DWCNT), or another multi-walled carbon nanotube (MWCNT).

In one embodiment carbon coating 120 surrounds substantially all of outer surface 111 of carbon nanotube 110. In the same or another embodiment, a structure of carbon coating 120 is that of a graphite sheet. In a manner that will be further described below, carbon coating 120 may be derived from a nitrile-containing polymer.

Carbon coating 120 comprises a reactive surface 121 having dangling carbon bonds to which may be attached materials that reduce thermal and/or electrical contact resistance between carbon nanotube 110 and still other materials that may be desirable in a microelectronics environment. In FIG. 1, a low contact resistance layer 130 is located exterior to carbon coating 120 and interior to a metal layer 140. Low contact resistance layer 130 is an example of a material that reduces thermal and/or electrical contact resistance between carbon nanotube 120 and metal layer 140. In one embodiment low contact resistance layer 130 comprises a carbide-forming metal (which has a high affinity to carbon). In another embodiment low contact resistance layer 130 comprises a matrix-compatible polymer, where the matrix could include metal layer 140 or a polymer or the like.

The electrical contact resistance of carbon nanotubes may be lowered by applying a coating of carbon paste or carbon black around the carbon nanotubes because carbon paste is composed of small graphite sheets which would stack onto the carbon nanotubes. This carbon paste or carbon black may form carbon coating 120. Due to the similarity in electronic structure between carbon nanotubes and these carbon coatings one would expect low electrical contact resistance between the two materials.

To a first order, thermal contact resistance is a function of lattice mismatch at the interface; the greater the mismatch the worse is the thermal resistance. Carbon coating 120 may have lattice parameters similar to those of carbon nanotubes 110, in that both contain the structure of graphite sheets. Thus, one would expect the carbon coating to reduce the thermal interface resistance across the nanotube surface.

In a non-illustrated embodiment of the invention low contact resistance layer 130 may be omitted and carbon coating 120 may be immediately adjacent to metal layer 140. However, the presence of low contact resistance layer 130 may create a smooth gradient of properties between carbon nanotube 120 and metal layer 140 without disturbing the intrinsic structure and properties of carbon nanotube 120. Because of its role in smoothly bridging a gap between carbon nanotube properties and matrix metal (or polymer) properties, low contact resistance layer 130 may also be referred to at times herein as a transition layer. Alternatively, another metal layer or polymer layer or the like having properties that lie between those of carbon nanotubes and matrix materials can act as such a transition layer. As an example, the transition layer can comprise copper, nickel, ruthenium, platinum, or the like. It should be noted that carbon coating 120 also acts as a transition layer in that it too has properties that bridge a gap between carbon nanotubes and matrix materials, but carbon coating 120 is referred to herein with its own name and reference numeral in order to make it clear that it is a distinct layer separate from low contact resistance layer 130 (or another transition layer).

A wide variety of nitrile-containing polymers can be utilized to obtain carbon coating 120, including polyacrylonitrile, poly(phthalonitrile), copolymers such as poly(styrene)-b-poly(phthalonitrile) and the like. As further discussed below, the initial polymer stabilization can be achieved by bulk dispersion of the polymer in solvent via wet chemistry techniques or by controlled stabilization methods utilizing colloid chemistry techniques where the nanotubes must first be acidified and then stabilized.

Figure 2:
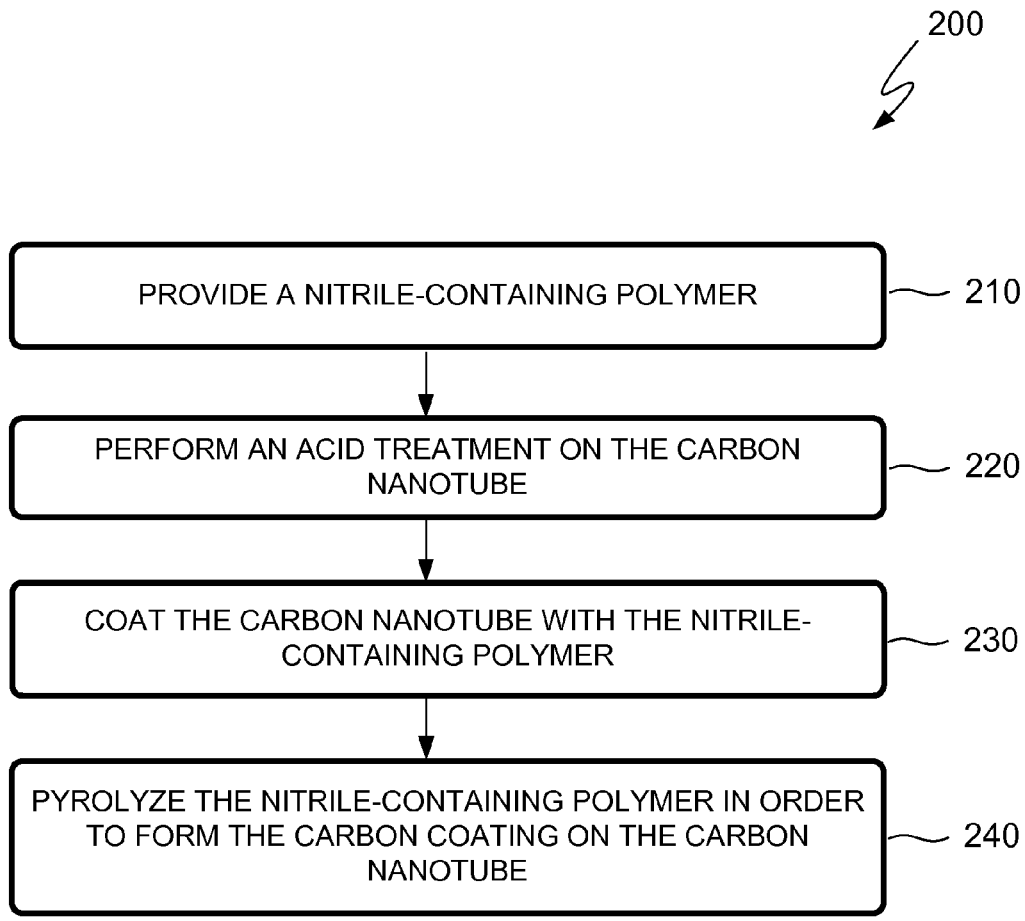
FIG. 2 is a flowchart illustrating a method of applying a carbon coating to a carbon nanotube according to an embodiment of the invention.

FIG. 2 is a flowchart illustrating a method 200 of applying a carbon coating to a carbon nanotube according to an embodiment of the invention. A step 210 of method 200 is to provide a nitrile-containing polymer. As an example, the nitrile-containing polymer can include poly(acrylonitrile), poly(phthalonitrile), copolymers such as poly(styrene)-b-poly(phthalonitrile), block copolymer polymer stabilizers such as poly(styrene-b-4-vinylphenoxyphthalonitrile), and the like. More generally, any polymer containing a nitrile group may be used.

A step 220 of method 200 is to perform an acid treatment on the carbon nanotube in order to enhance the adsorption of the nitrile-containing polymer to the carbon nanotube. Step 220 is an optional step that may be omitted in certain embodiments of method 200 and for certain polymers. Step 220 or another step may further comprise centrifuging and washing the carbon nanotube and then drying it in order to remove any non-adsorbed polymer.

A step 230 of method 200 is to coat the carbon nanotube with the nitrile-containing polymer. In one embodiment, step 230 comprises dispersing the nitrile-containing polymer in a solvent such that the nitrile-containing polymer is adsorbed to the carbon nanotube. In this embodiment polymers such as homopolymers and random copolymers containing acrylonitrile/phthalonitrile may be used to generate graphitic coating on carbon nanotubes by bulk dispersion of polymer in solvent. The adsorption of the polymer to the carbon nanotube can be enhanced by acid treatment as in step 220.

In another embodiment, step 230 comprises electrospinning the nitrile-containing polymer and the carbon nanotube in order to create a nanofiber composite. In an embodiment where the nitrile-containing polymer comprises a block copolymer, step 230 can comprise acidifying the carbon nanotube and attaching the block copolymer to the carbon nanotube using a colloidal chemistry method. As an example, the polymers can be block copolymers such as poly(styrene)-b-poly(phthalonitrile). The carbon nanotubes may be acidified as in step 220 and then coated with the block copolymers by colloidal chemistry methods such as micelle formation, where the polar nitrile components complex the COOH (or other acid) groups on the carbon nanotube surface. When nonpolar solvent is added to the mixture the polystyrene pultrudes out into the nonpolar solvent.

A step 240 of method 200 is to pyrolyze the nitrile-containing polymer in order to form the carbon coating on the carbon nanotube. The pyrolysis of step 240 converts the polymer coating to a carbon/graphitic coating. In one embodiment, step 240 comprises pyrolyzing the nitrile-containing polymer at a temperature greater than 500 degrees Celsius. In a particular embodiment, step 240 comprises pyrolyzing the nitrile-containing polymer in a tube furnace or the like at approximately 700 degrees Celsius for approximately six hours in argon.

Figure 3:
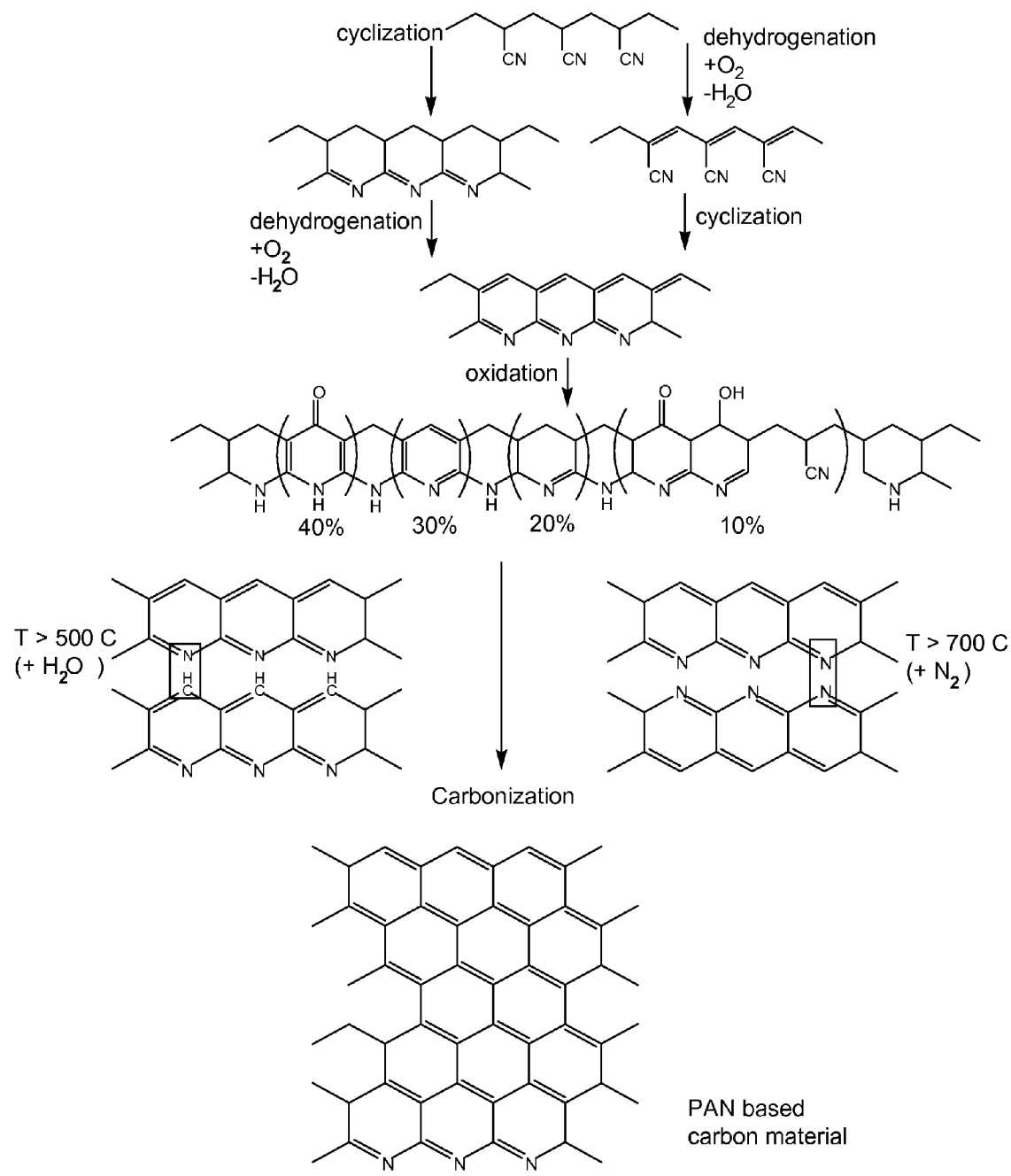
FIG. 3 is a representation of the pyrolysis of poly(acrylonitrile) into a graphitic form suitable for use as a coating on a carbon nanotube according to an embodiment of the invention.

FIG. 3 is a representation of the pyrolysis of poly(acrylonitrile) into a graphitic form suitable for use as a coating on a carbon nanotube according to an embodiment of the invention. Pyrolysis of other polymers proceeds in a similar manner. It should be noted that the graphitic sheets that result from the illustrated pyrolysis procedure have the same structure that would be obtained by slicing a carbon nanotube open lengthwise and unrolling it. As discussed above, this structural similarity between the carbon nanotubes and the graphitic sheets of the carbon coating may produce low electrical contact resistance at the carbon nanotube/carbon coating interface.

Figure 4:
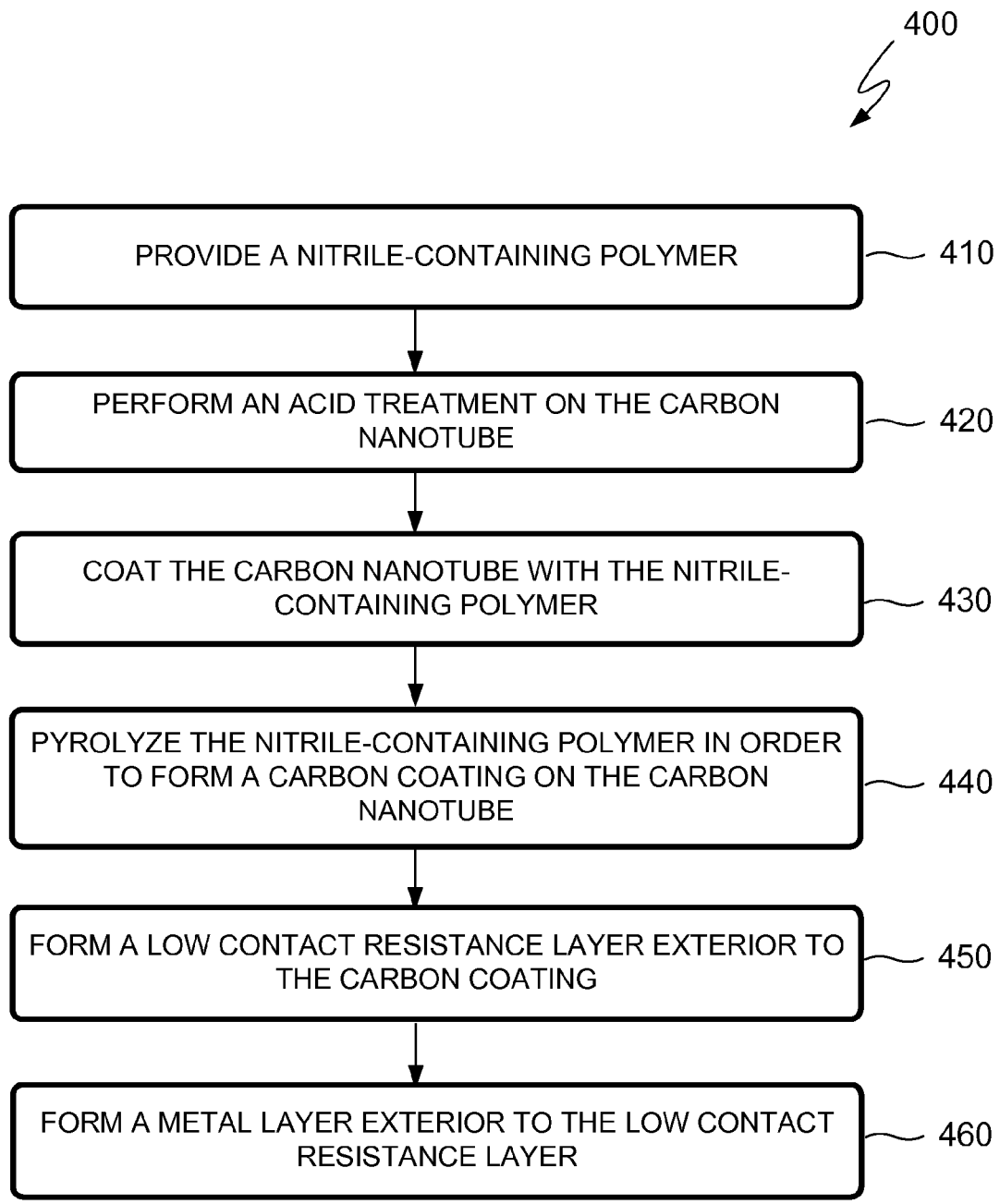
FIG. 4 is a flowchart illustrating a method of reducing a contact resistance of a carbon nanotube according to an embodiment of the invention.

FIG. 4 is a flowchart illustrating a method 400 of reducing a contact resistance of a carbon nanotube according to an embodiment of the invention. A step 410 of method 400 is to provide a nitrile-containing polymer. As an example, and as stated above, the nitrile-containing polymer can include poly(acrylonitrile), poly(phthalonitrile), copolymers such as poly(styrene)-b-poly(phthalonitrile), block copolymer polymer stabilizers such as poly(styrene-b-4-vinylphenoxyphthalonitrile), and the like. More generally, any polymer containing a nitrile group may be used.

A step 420 of method 400 is to perform an acid treatment on the carbon nanotube in order to enhance the adsorption of the nitrile-containing polymer to the carbon nanotube. Step 420 is an optional step that may be omitted in certain embodiments of method 400 and for certain polymers. Step 420 or another step may further comprise centrifuging and washing the carbon nanotube and then drying it in order to remove any non-adsorbed polymer.

A step 430 of method 400 is to coat the carbon nanotube with the nitrile-containing polymer. As an example, step 430 can proceed according to any of the embodiments described above in connection with step 230 of method 200, or similar embodiments.

A step 440 of method 400 is to pyrolyze the nitrile-containing polymer in order to form a carbon coating on the carbon nanotube. The pyrolysis of step 440 converts the polymer coating to a carbon/graphitic coating. In one embodiment, step 440 comprises pyrolyzing the nitrile-containing polymer at a temperature greater than 500 degrees Celsius. In a particular embodiment, step 440 comprises pyrolyzing the nitrile-containing polymer in a tube furnace or the like at a temperature of not more than approximately 700 degrees Celsius for approximately six hours in argon.

A step 450 of method 400 is to form a low contact resistance layer exterior to the carbon coating. As an example, the low contact resistance layer can be similar to low contact resistance layer 130 that is shown in FIG. 1.

A step 460 of method 400 is to form a metal layer exterior to the low contact resistance layer. As an example, the metal layer can be similar to metal layer 140 that is shown in FIG. 1.

Figure 5:
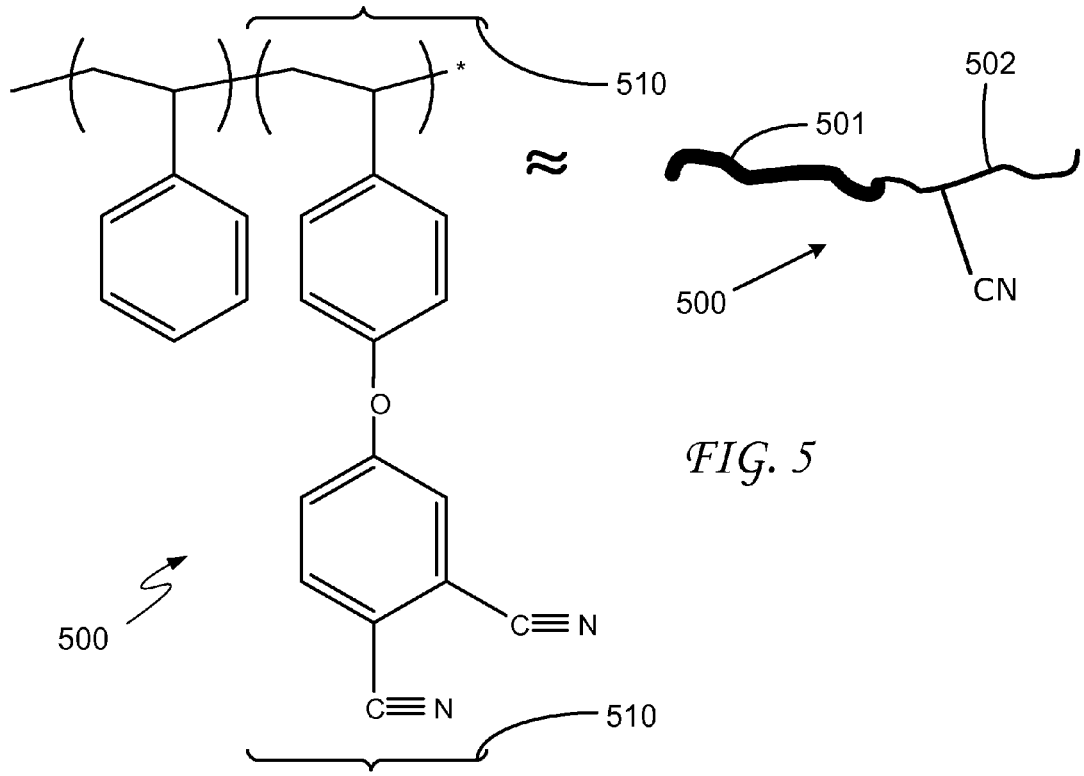
FIG. 5 is a representation of a polymer that may be used in the formation of a carbon coating according to an embodiment of the invention.

FIG. 5 is a schematic representation of a polymer 500 that may be used in the formation of carbon coating 120 according to an embodiment of the invention. Polymer 500 is a block copolymer polymer stabilizer poly(styrene-b-4-vinylphenoxyphthalonitrile). A first (unbracketed) block of polymer 500 is a nonpolar polystyrene segment. A second block of polymer 500 (indicated by brackets 510) is a polar block segment containing nitrile groups, as indicated. Polymer 500 is shown in simplified form on the right-hand side of FIG. 5, where two major blocks of polymer 500 are depicted. A block 501 corresponds to the first (unbracketed) block, while a block 502 corresponds to the second block (with brackets 510) containing the nitrile group. (The different line widths for blocks 501 and 502 are merely an artifice introduced in order to help distinguish the blocks from each other.)

Figure 6:
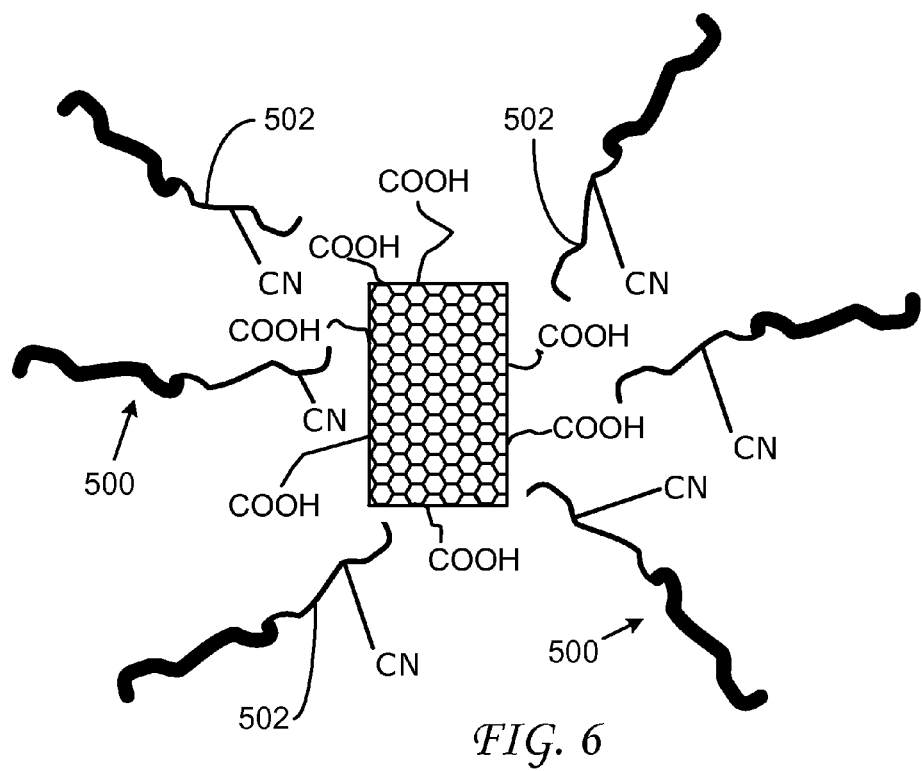
FIG. 6 is a schematic representation according to an embodiment of the invention showing polar nitrile segments of the polymer of FIG. 5 interacting with acidified carbon nanotubes.

FIG. 6 is a schematic representation according to an embodiment of the invention showing polar nitrile segments (blocks 502) of polymer 500 interacting with an acidified carbon nanotube. Following pyrolysis, the carbon-coated carbon nanotubes may then be further coated with a low contact resistance/transition layer and/or a metal/polymer matrix layer, as explained above.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the thermally and electrically conductive structure, the methods of applying a carbon coating to a carbon nanotube, and the methods of reducing a contact resistance of a carbon nanotube discussed herein may be implemented in a variety of embodiments, and that the foregoing discussion of certain of these embodiments does not necessarily represent a complete description of all possible embodiments.

Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A thermally and electrically conductive structure comprising:
   a carbon nanotube having an outer surface;
   a first transition layer, comprising a graphite sheet, covering at least a portion of the outer surface of the carbon nanotube;
   a second transition layer exterior to the first transition layer; and
   a metal layer exterior to the second transition layer.

2. The thermally and electrically conductive structure of claim 1 wherein:
   the first transition layer surrounds substantially all of the outer surface of the carbon nanotube.

3. The thermally and electrically conductive structure of claim 1 wherein:
the first transition layer provides the thermally and electrically conductive structure with a reactive surface.

4. The thermally and electrically conductive structure of claim 1 wherein:
the second transition layer is a low contact resistance layer.

5. The thermally and electrically conductive structure of claim 1 wherein:
the second transition layer comprises a metal or a polymer.

6. The thermally and electrically conductive structure of claim 5 wherein:
the second transition layer comprises one of copper, nickel, ruthenium, and platinum.

7. The thermally and electrically conductive structure of claim 1 wherein:
the first transition layer is derived from a nitrile-containing polymer.

8. A method of reducing a contact resistance of a carbon nanotube, the method comprising:
providing a nitrile-containing polymer;
coating the carbon nanotube with the nitrile-containing polymer;
pyrolyzing the nitrile-containing polymer in order to form a first transition layer, comprising a graphite sheet, on the carbon nanotube;
forming a low contact resistance layer exterior to the first transition layer; and
forming a metal layer exterior to the low contact resistance layer.

9. The method of claim 8 further comprising:
performing an acid treatment on the carbon nanotube.

10. The method of claim 9 wherein:
pyrolyzing the nitrile-containing polymer comprises pyrolyzing the nitrile-containing polymer in a tube furnace at a temperature of not more than approximately 700 degrees Celsius for approximately six hours in argon.

11. A thermally and electrically conductive structure comprising:
a carbon nanotube having an outer surface;
a first transition layer, comprising a graphite sheet, in physical contact with the outer surface of the carbon nanotube;
a second transition layer in physical contact with the first transition layer; and
a metal layer in physical contact with the second transition layer.

12. The thermally and electrically conductive structure of claim 11 wherein:
the first transition layer has a lattice parameter that causes a reduction in thermal interface resistance across the outer surface of the carbon nanotube.

13. The thermally and electrically conductive structure of claim 11 wherein:
the first transition layer provides the thermally and electrically conductive structure with a reactive surface.

14. The thermally and electrically conductive structure of claim 11 wherein:
the first transition layer is derived from a nitrile-containing polymer.

* * * * *